United States Patent
Cote et al.

(10) Patent No.: US 7,166,229 B2
(45) Date of Patent: Jan. 23, 2007

(54) METHOD AND APPARATUS FOR EXTRACTING LIQUID PRESENT IN A HUMID MASS

(75) Inventors: Pierre Cote, Black Lake (CA); Michel Fortier, Saint-Adrien-d'Irlande (CA); Serge Fournier, Robertsonville (CA)

(73) Assignee: Les Industries Fournier Inc., Quebec (CA)

( * ) Notice: Subject to any disclaimer, the term of this patent is extended or adjusted under 35 U.S.C. 154(b) by 93 days.

(21) Appl. No.: 10/481,125

(22) PCT Filed: Jul. 5, 2002

(86) PCT No.: PCT/CA02/01026

§ 371 (c)(1), (2), (4) Date: Aug. 20, 2004

(87) PCT Pub. No.: WO03/004130

PCT Pub. Date: Jan. 16, 2003

(65) Prior Publication Data

US 2005/0000917 A1    Jan. 6, 2005

(30) Foreign Application Priority Data

Jul. 5, 2001    (CA)    .................................... 2352414

(51) Int. Cl.
 *B01D 37/04*  (2006.01)
 *B30B 3/04*  (2006.01)
(52) U.S. Cl. .............. 210/739; 210/741; 210/770; 210/780; 210/103; 100/158 C
(58) Field of Classification Search ............... 210/741, 210/770
See application file for complete search history.

(56) References Cited

U.S. PATENT DOCUMENTS 1,739 A * 8/1840 Wells .......................... 241/252

(Continued)

FOREIGN PATENT DOCUMENTS

CA    1 193 903    9/1985

(Continued)

OTHER PUBLICATIONS

"Pulp Mill Clarifier Sludge Dewatering using a Ring Press," down loaded from: http://oee.nrcan.gc.ca/Publications/infosource/Pub/ici/caddet/english/R164.cfm?text=N&printview=N, □□8 pages, dated Mar. 1994.*

*Primary Examiner*—Robert James Popovics
*Assistant Examiner*—T. Woodruff
(74) *Attorney, Agent, or Firm*—Buchanan Ingersoll & Rooney PC

(57) ABSTRACT

A system for extracting a liquid by pressing a humid mass, the system including at least one extraction channel, while extraction channel being provided with at least one inlet allowing to feed the extraction channel with the humid mass to be treated; with walls provided with holes allowing the flow of the liquid contained in the humid mass being pressed, and with at least one outlet allowing the discharge of the dehydrated mass obtained by pressing in the extracting channel, wherein the outlet of the channel, positioned between the walls provided with holes and the exterior, is free of constraints or only includes weak constraints whose level is controlled as a function of physical parameters. This systems is suitable for the efficient continuous dewatering treatment of a feeding source with a composition, consistency and nature of the solid particles present in the feeding source susceptible to vary during the processing.

20 Claims, 11 Drawing Sheets

U.S. PATENT DOCUMENTS

| | | | | |
|---|---|---|---|---|
| 35,787 A * | 7/1862 | Spencer | | 100/158 C |
| 43,095 A * | 6/1864 | Clarke | | 241/252 |
| 71,165 A * | 11/1867 | Harper | | 100/158 C |
| 115,112 A * | 5/1871 | Seger | | 100/173 |
| 119,472 A * | 10/1871 | Patterson | | 100/158 R |
| 172,055 A * | 1/1876 | Schwanegel et al. | | 100/158 C |
| 198,476 A * | 12/1877 | Weed | | 241/229 |
| 241,243 A * | 5/1881 | Selwig | | 100/158 C |
| 271,161 A * | 1/1883 | Treber | | 100/158 R |
| 958,085 A * | 5/1910 | Brown et al. | | 241/141 |
| 1,018,267 A * | 2/1912 | Rach | | 100/158 C |
| 1,040,842 A * | 10/1912 | Anderson | | 100/158 C |
| 1,092,800 A * | 4/1914 | Rach | | 100/158 C |
| 1,264,635 A * | 4/1918 | Graham | | 210/331 |
| 2,083,462 A * | 6/1937 | Long et al. | | 241/252 |
| 2,084,229 A * | 6/1937 | Van Maanen | | 100/37 |
| 2,146,158 A * | 2/1939 | Scherer | | 100/158 C |
| 2,226,926 A * | 12/1940 | Gordon | | 100/158 C |
| 2,356,122 A * | 8/1944 | Edwards | | 100/158 C |
| 2,407,365 A * | 9/1946 | Clemetsen et al. | | 100/158 C |
| 2,617,354 A * | 11/1952 | Ingalls | | 100/105 |
| 2,793,583 A * | 5/1957 | Messing | | 100/45 |
| 2,945,431 A * | 7/1960 | Wehr | | 100/97 |
| RE25,228 E * | 8/1962 | Wehr | | 100/97 |
| 3,053,171 A * | 9/1962 | Asplund | | 100/158 C |
| 3,086,453 A * | 4/1963 | Asplund | | 100/106 |
| 3,105,434 A * | 10/1963 | Messing | | 100/158 C |
| 3,161,123 A * | 12/1964 | Leslie et al. | | 100/37 |
| 3,204,551 A * | 9/1965 | Messing | | 100/158 C |
| 3,218,963 A * | 11/1965 | Ginaven et al. | | 100/121 |
| 3,245,339 A * | 4/1966 | Leslie et al. | | 100/105 |
| 3,357,345 A * | 12/1967 | Hamilton | | 100/158 R |
| 3,431,839 A * | 3/1969 | Price et al. | | 100/158 R |
| 3,447,450 A * | 6/1969 | Wilhelm | | 100/116 |
| 3,513,770 A * | 5/1970 | Price et al. | | 100/158 R |
| 3,520,251 A * | 7/1970 | Bodine | | 100/118 |
| 3,559,567 A * | 2/1971 | Yoritomi | | 100/158 C |
| 3,570,394 A * | 3/1971 | Christy et al. | | 100/104 |
| 3,657,998 A * | 4/1972 | Yoritomi | | 100/158 C |
| 3,698,311 A * | 10/1972 | Yoritomi | | 100/158 C |
| 3,741,388 A | 6/1973 | Takahashi | | |
| 3,769,904 A * | 11/1973 | Yoritomi | | 100/158 C |
| 3,772,144 A * | 11/1973 | Luthi et al. | | 162/210 |
| 3,774,528 A * | 11/1973 | Reinhall | | 100/121 |
| 3,948,165 A * | 4/1976 | Seifert | | 100/116 |
| 3,980,518 A * | 9/1976 | Ljung et al. | | 162/302 |
| 4,084,496 A * | 4/1978 | Ehernberger et al. | | 100/35 |
| 4,099,458 A * | 7/1978 | Seifert | | 100/116 |
| 4,111,115 A * | 9/1978 | Cory | | 100/116 |
| 4,139,467 A * | 2/1979 | Fritzvold et al. | | 210/97 |
| 4,170,935 A * | 10/1979 | Rohm et al. | | 100/121 |
| 4,207,811 A * | 6/1980 | Kline | | 100/121 |
| 4,266,413 A * | 5/1981 | Yli-Vakkuri | | 68/158 |
| 4,273,035 A * | 6/1981 | Cusi | | 100/37 |
| 4,321,140 A * | 3/1982 | Luthi | | 210/327 |
| 4,534,868 A * | 8/1985 | Barbulescu et al. | | 210/780 |
| 4,565,602 A | 1/1986 | Haartti et al. | | |
| 4,586,665 A * | 5/1986 | Eriksson | | 241/259.2 |
| 4,655,406 A * | 4/1987 | Eriksson | | 241/261 |
| 4,769,986 A * | 9/1988 | Kokkonen et al. | | 68/181 R |
| 4,986,881 A * | 1/1991 | Funk | | 162/56 |
| 5,205,941 A * | 4/1993 | Funk et al. | | 210/770 |
| 5,213,686 A * | 5/1993 | Funk et al. | | 210/350 |
| 5,337,655 A * | 8/1994 | Bielfeldt | | 100/311 |
| 5,344,575 A * | 9/1994 | Boulet et al. | | 210/780 |
| 5,709,801 A * | 1/1998 | Murofushi et al. | | 210/770 |
| 5,864,034 A * | 1/1999 | Murofushi et al. | | 536/124 |
| 6,004,468 A * | 12/1999 | Barbulescu et al. | | 210/739 |
| 6,042,735 A | 3/2000 | Gommel et al. | | |
| 6,098,532 A * | 8/2000 | Sebastian et al. | | 100/41 |
| 6,194,564 B1 * | 2/2001 | Murofushi et al. | | 536/114 |
| 6,206,204 B1 | 3/2001 | Aikawa | | |
| 6,439,113 B1 * | 8/2002 | Gawlitta et al. | | 100/38 |
| 6,792,850 B1 * | 9/2004 | Scheucher et al. | | 100/127 |
| 2005/0000917 A1 * | 1/2005 | Cote et al. | | 210/780 |

FOREIGN PATENT DOCUMENTS

| | | | |
|---|---|---|---|
| EP | 718311 A2 * | 6/1996 | |
| EP | 761692 A2 * | 3/1997 | |
| GB | 2289052 A * | 11/1995 | |
| JP | 07278202 A * | 10/1995 | |
| JP | 09025301 A * | 1/1997 | |
| JP | 09077802 A * | 3/1997 | |
| JP | 2001113109 | 4/2001 | |
| WO | 01/26776 A1 | 4/2001 | |

* cited by examiner

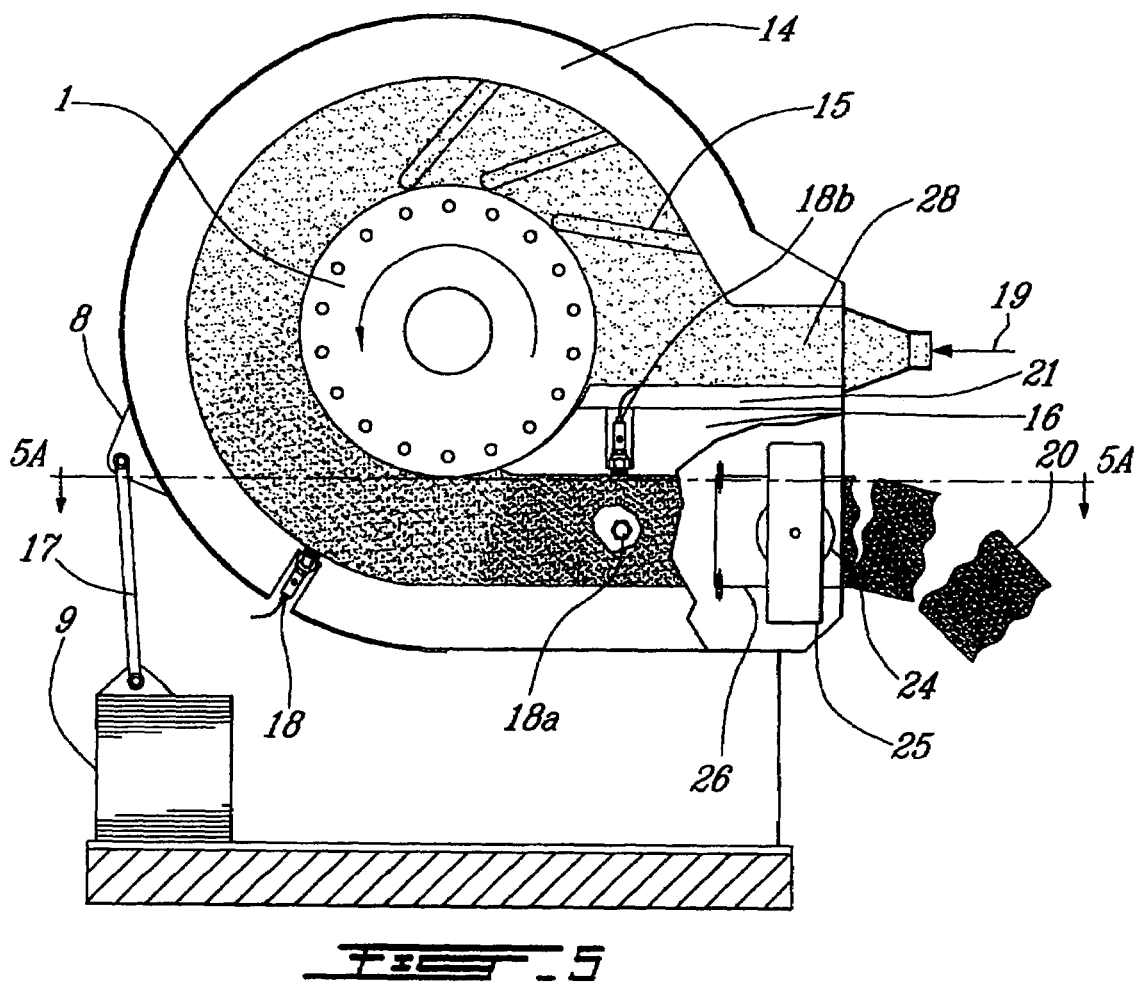
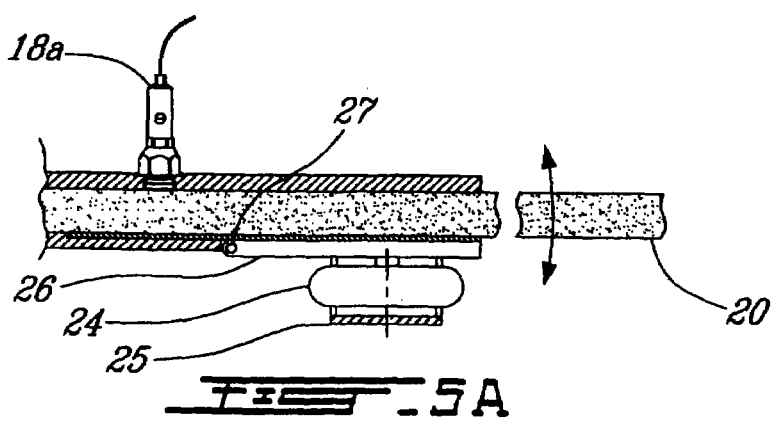

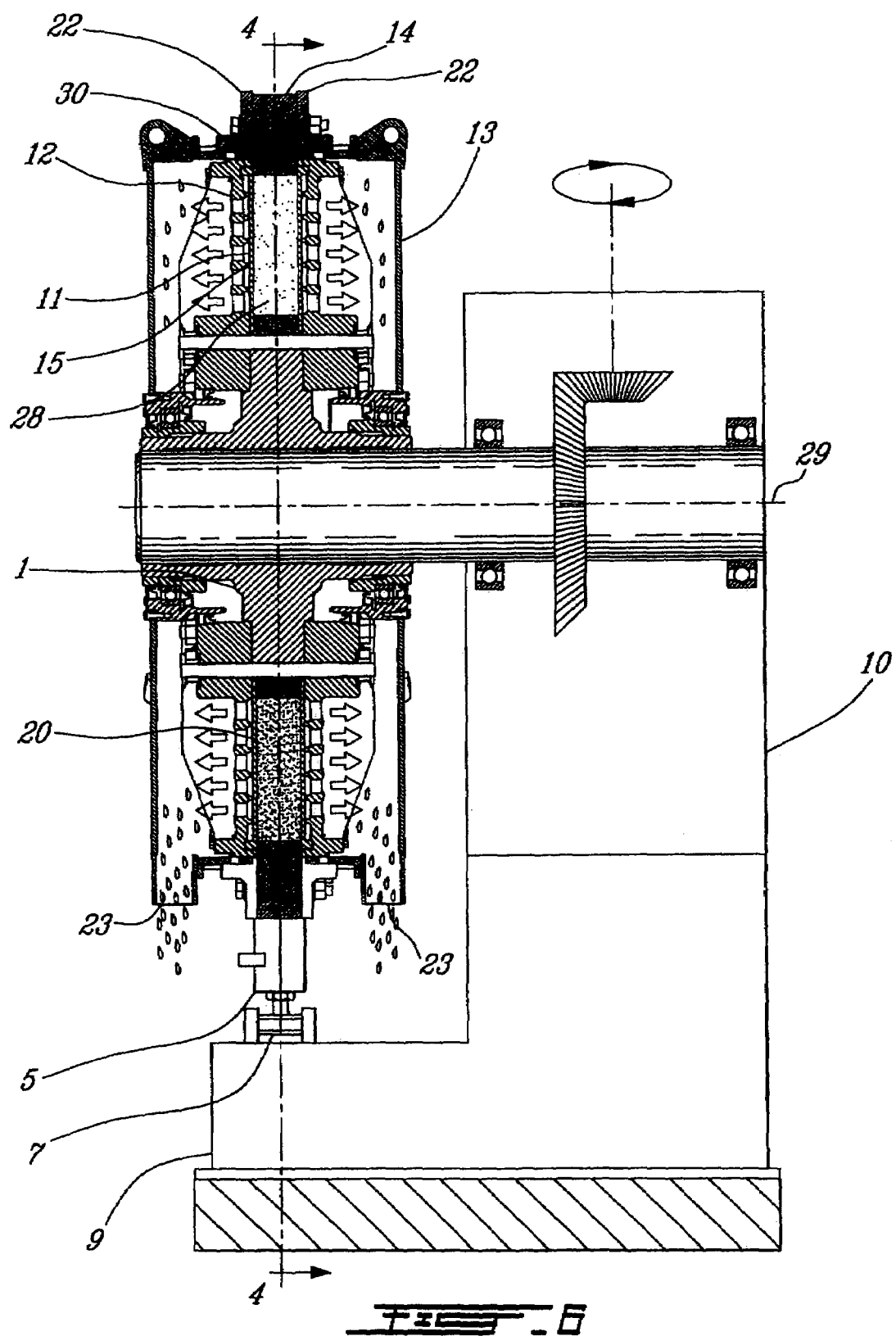

METHOD AND APPARATUS FOR EXTRACTING LIQUID PRESENT IN A HUMID MASS

FIELD OF THE INVENTION

The present invention relates to a system for processing liquid containing material such as bulk, past or slurry material. This system is particularly interesting as a system for continuously extracting a liquid from a humid material by pressuring said material and/or by recovering the compressed and dehumidified material. This system is furthermore particularly interesting for the continuous treatment of feeding material having a composition that changes during the processing of said material and/or for the continuous treatment of humid masses having a strong aptitude for salting out the liquid phase.

BACKGROUND OF THE INVENTION

Various systems for extracting liquid and/or for compacting solid matters present in a solid-liquid material are known from the prior art. Such systems are used inter alia for the treatment of pulps resulting from paper industries, waste water treatment, mineral processing, agriculture and food processing, fisheries, breweries, wineries, chemical processing, oil and tar sand industry, etc. . . .

Known batch systems perform only filtration by using the feed pressure to force the liquid out through the mass of solid-liquid material and a filtering means. By combining filtration and mechanical pressure, a dryer cake is recovered.

Such batch systems as those described in patent U.S. Pat. No. 4,565,602, are successfully used in the de-watering treatment of low-consistency slurries containing fine particles but are not suited for the treatment of pastes solid-liquid materials containing large particles.

In order to overcome the above-mentioned limitations of the batch systems and in order to improve the efficiency of dewatering plants, continuous systems have been developed. For example U.S. Pat. No. 4,534,868 describes a U-channel rotary press allowing the treatment of pastes and fibrous solid-liquid material. But this system was found not to be appropriate for the treatment of slurries containing fine particles, particularly for pastes containing fibrous materials.

Further continuous systems which are improvements of the system according to U.S. Pat. No. 4,534,868 are described in U.S. Pat. No. 4,986,881, U.S. Pat. No. 4,534,868 and U.S. Pat. No. 5,213,686. However, those systems still present limitations in a continuous use since the structure and particularly the size and the form of the constituting elements of the system should be carefully adapted to the specific composition and/or consistency of the liquid-solid material to be treated otherwise blockage of the system occurs and poor yields are unavoidable.

U.S. Pat. No. 5,205,941 describes a dewatering system having a number of rotors rotable in a cylindrical press housing with an inlet channel defining an inlet for a humid mass into the housing, a mechanism for equalising the amount of the mass fed to the inlet channel. A screw feeder is associated with each inlet channel, and equalization is accomplished by providing opening communication between the screw feeders at their pressure ends, adjacent the inlet channels. A module having a conduit associated with each inlet channel, and a cross over tunnel at the portion of the module adjacent the press housing, is disposed between the feeder screw housing and the press housing. The mass outlet of the press housing including a restrictor pate and means for applying a load to said restrictor plate. The use of this system is limited to the treatment of liquid-solid material with a high viscosity and containing (fine, large) particles. Such a system is not suited for the treatment of solid-liquid material feeding with a liquid concentration that may change during processing.

The restraint system existing in equipment such as those rotative extractors described in the Canadian patent CA-A-1,193,903 and in patent U.S. Pat. No. 5,344,575 does not permit the dehydration of some sludges containing materials with a high dehydration potential and with a high friction potential of the product at the exit of the equipment (cake).

In effect, such sludges due to the materials that they contain generate a high friction (fibres, material composed by relatively coarse agglomerates, etc.) at the level of the walls of the filtrating elements.

These sludges of various origins (industrial fields, cities, paste and papers, etc.) have the particularity of generating a blockage of the exit of the dehydration equipment during the process. The high friction generated favours the formation of cakes having a relatively high siccity and a very rigid consistence and textures which is comparable to a brick instead of the rigidity of a sponge at the exit of rectangular walls of the rotative extractor. This very rigid consistence results in that the cake, which has lost its elasticity, does not transfer any effort to the device for the control of the pressure at the exit of the extractor, with the consequence of frequent blockages generating a substantial loss of yield.

There was therefore a need for a single extracting system suitable for the efficient continuous treatment of various liquid-solid materials with various liquid concentration, consistency and size of solid particles.

There was also a need for an extracting system suitable for the continuous dewatering treatment of a feeding source, i.e. of a liquid solid with a composition, consistency and nature of the solid particles present in the feeding source susceptible to vary during the processing.

SUMMARY OF THE INVENTION

Therefore, in accordance with the present invention, there is provided an apparatus for extracting a liquid by pressing a humid mass, said apparatus comprising at least one extraction channel for liquid removal, which extraction channel being provided with:

at least one inlet for feeding the extraction channel with the humid mass to be treated;

walls provided with holes for allowing liquid contained in the humid mass being pressed to evacuate from said extraction channel, the humid mass gradually becoming a dehydrated mass; and at least one outlet for discharging the dehydrated mass, in the form of a cake, obtained by pressing the humid mass in the extraction channel, the cake having a lower liquid content than the humid mass;

wherein said outlet of said channel, positioned between the walls provided with holes and the exterior, is substantially free of constraints or only comprises weak constraints whose level is controlled as a function of physical parameters related to the pressing of the humid mass in the extraction channel.

In the context of the present invention, the expression "dehydrated mass" means a mass with a reduced liquid content, said dehydrated mass being obtained by reducing the liquid content of the humid mass feeding the extractor channel.

According to a preferred embodiment this system, the outlet of the channel is provided with a device, preferably of the gate type or of the flap type, ensuring the control and the holding up (preferably vertical) of the dehydrated humid mass (cake) arriving at the outlet of the channel, said device ensuring the management of the level of resistance generated on said dehydrated mass at the outlet of the extraction channel, as a function of the entrainment force exerted by the friction generated by the dehydrated cake on said extraction channel and/or as a function of the pressure within said extraction channel, and/or as a function of pressure on the walls of the extraction channel.

According to a further preferred embodiment, the system according to the present invention is constructed by modifying a rotary press, preferably a rotary press being one of the type described in U.S. Pat. No. 5,344,575 or one of the type described in Canadian Patent No. CA-A-1,193,903. Such a rotary press comprises a cylindrical housing having a first and a second end wall and a cylindrical side wall. A pumping system is also provided for forcing said humid mass into the inlet. A rotor has one or more pairs of side walls, which are joined to a bottom wall and define one or more channels open at their periphery in at least a portion thereof. One or more rotor side walls are provided with perforations. The rotor has a central shaft for rotation with respect to the housing, this shaft having a conduit extending longitudinally theretrough, and is provided with one or more rotor draining conduits having a first portion in fluid communication with the perforations. One or more rotor sidewalls are moved upon rotation of the central shaft. The draining conduit has a second portion in fluid communication with the shaft conduit. A drive is connected to the shaft for rotating the rotor and the apparatus is provided with one or more outlets for discharging matter containing a reduced percentage of liquid therein upon rotation of the rotor, the channel being in direct communication with the shaft conduit.

According to a more specific embodiment, a downstream end of the outlet of said channel only has an upper wall, the downstream end being opened at its lateral sides and at its bottom.

Also in accordance with the present invention, there is provided the use of one of the apparatuses according to the present invention for dehydrating a humid mass. The humid mass treated is preferably selected in the group constituted by pulps resulting from paper industries, humid mass resulting from waste water treatment, mineral processing, agriculture and food processing, from fisheries, breweries, wineries, chemical processing, and oil industry.

Another preferred embodiment is the use of the apparatus according to the present invention for dehydrating a humid mass having the ability to develop high friction at the outlet of an extracting and pressing apparatus, and/or for dehydrating humid masses having a strong aptitude for salting out the liquid phase.

Further in accordance with the present invention, there is provided a device for controlling and for holding up a dehydrated mass obtained at an outlet of an extraction channel of a system for extracting a liquid by pressing a humid mass fed into the system, said device comprising:

a first system for allowing the measuring of the entrainment force exerted by the friction generated, on said extraction channel, by the humid mass being dehydrated, and/or allowing the measuring of the pressure within the extraction channel and/or of the pressure on the walls of said extraction channel; and a second system for allowing to regulate constraints generated by said dehydrated mass, at the outlet of said extraction channel, as a function at least one of said entrainment force and/or as a function of the pressure measured with said first system.

According to a preferred embodiment, the second system allows to vertically regulate constraints generated by the dehydrated mass.

According to another preferred embodiment, the second system allows to laterally regulates constraints generated by the dehydrated mass.

Further in accordance with the present invention, there is provided a process for extracting a liquid from a humid mass, said process comprising the steps of:

a) feeding with said humid mass an extracting zone, equipped with extracting means and with means for measuring the level of constraints generated in the extracting zone by the humid mass during its treatment;

b) extracting at least part of the liquid present in the humid mass by pressing said humid mass;

c) evacuating at least part of the extracted liquid from the extracting zone; and d) evacuating the mass with a reduced liquid content obtained in step b) from the extracting zone through an evacuation zone equipped with means for regulating the level of constraints generated by said mass with a reduced liquid content, when going through the evacuation zone;

wherein the level of constraints in the evacuation zone is regulated according to the level of constraints measured in the extracting zone.

This process is particularly advantageous for extracting a liquid from a humid mass, wherein the liquid represents from 0.1 to 22.0 weight percent of total weight of said humid mass.

The humid mass treated during the process is preferably selected in the group constituted by pulps resulting from paper industries, humid mass resulting from waste water treatment, mineral processing, agriculture and food processing, from fisheries, breweries, wineries, chemical processing, and oil industry.

The process according to the present invention allows the successful treatment of humid masses having shown a gain in dryness of at least 5%, preferably of at least 10%, and more preferably of at least 25%, measured according to the method AFNOR T97-001.

According to a further preferred embodiment of the process of the invention, the extracting zone comprises means capable of generating a pressure on the humid mass and walls provided with holes for evacuating at least part of the liquid contained in the humid mass being pressed against by the effect of the pressure.

Preferably, the walls of the extracting zone are equipped with means capable of measuring the pressure exerted on said wall by the humid mass during its treatment and/or the extracting zone is equipped with means capable of measuring the pressure inside the humid mass during the dehydrating process.

According to a more preferred embodiment of the present process the level of constraints in the outlet zone is controlled as a function of the physical parameter related to the pressure of the humid mass on the wall of the extracting zone, for example the levels of constraints in the outlet zone is controlled on the basis of a comparison of the physical parameters.

Various materials, such as metal, plastic materials, etc. ... may be used for fabricating the elements constituting the device for controlling and for holding up of the dehydrated mass according to the present invention.

The pieces that constitute the vertical restrictor are preferably selected to be easily adapted to different configurations of the extracting channel (height and width).

The form at the outlet of the restrictor, and more particularly of the device used to restrain the cakes at the outlet of the rotary extractor may vary, for example the restrictor may rounded externally or internally.

The device of the present invention i.e. the vertical device for restraining the cakes at the outlet of the rotary extractor may easily adapt to various sludges.

The system used to push the restraining device at the outlet of the rotary extractor may be of various types, e.g. pneumatic, hydraulic, electro-pneumatic, mechanical (for example a spring, etc.).

Another advantage of the present invention lies in the elimination of the shearing effect undergone by the cake at the outlet of the extracting channel and thus simultaneously eliminates the accidental losses of the mass to be dehydrated by the rotary extractor.

A rotative extractor which may be equipped by the device for the control and the restraint of cakes is illustrated in the Canadian patent number. 1.193.903 as well as in the patent granted in the United States under the number U.S. Pat. No. 5,344,575. The content of those two patents is incorporated by reference to the present application.

BRIEF DESCRIPTION OF THE DRAWINGS

FIG. 5: is a vertical cross-sectional view taken along line 5—5 of FIG. 7 and showing a fourth an exemplary apparatus according to the present invention using a pressure sensor to control the lateral restrictor.

FIG. 5A: is a cross-sectional view taken along line 5A—5A of FIG. 5.

FIG. 6: is a vertical cross-sectional view of the apparatus of FIG. 4 using a load sensor device to control a lateral restrictor.

Figure 1:
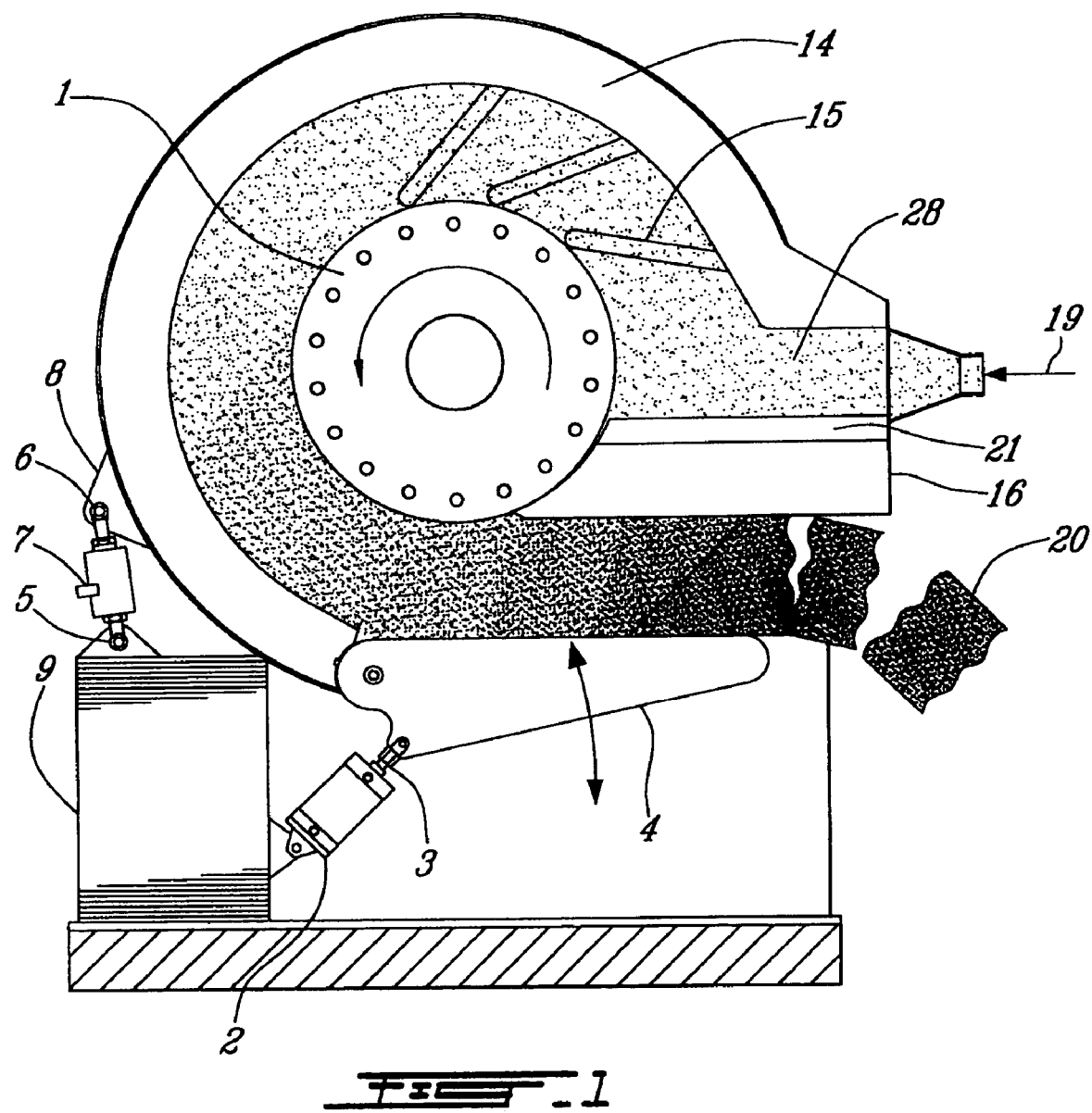
FIG. 1: is a vertical cross-sectional view taken along line 1—1 of FIG. 2 and showing an exemplary apparatus according to the present invention using a load sensor to control a vertical restrictor.
Figure 2:
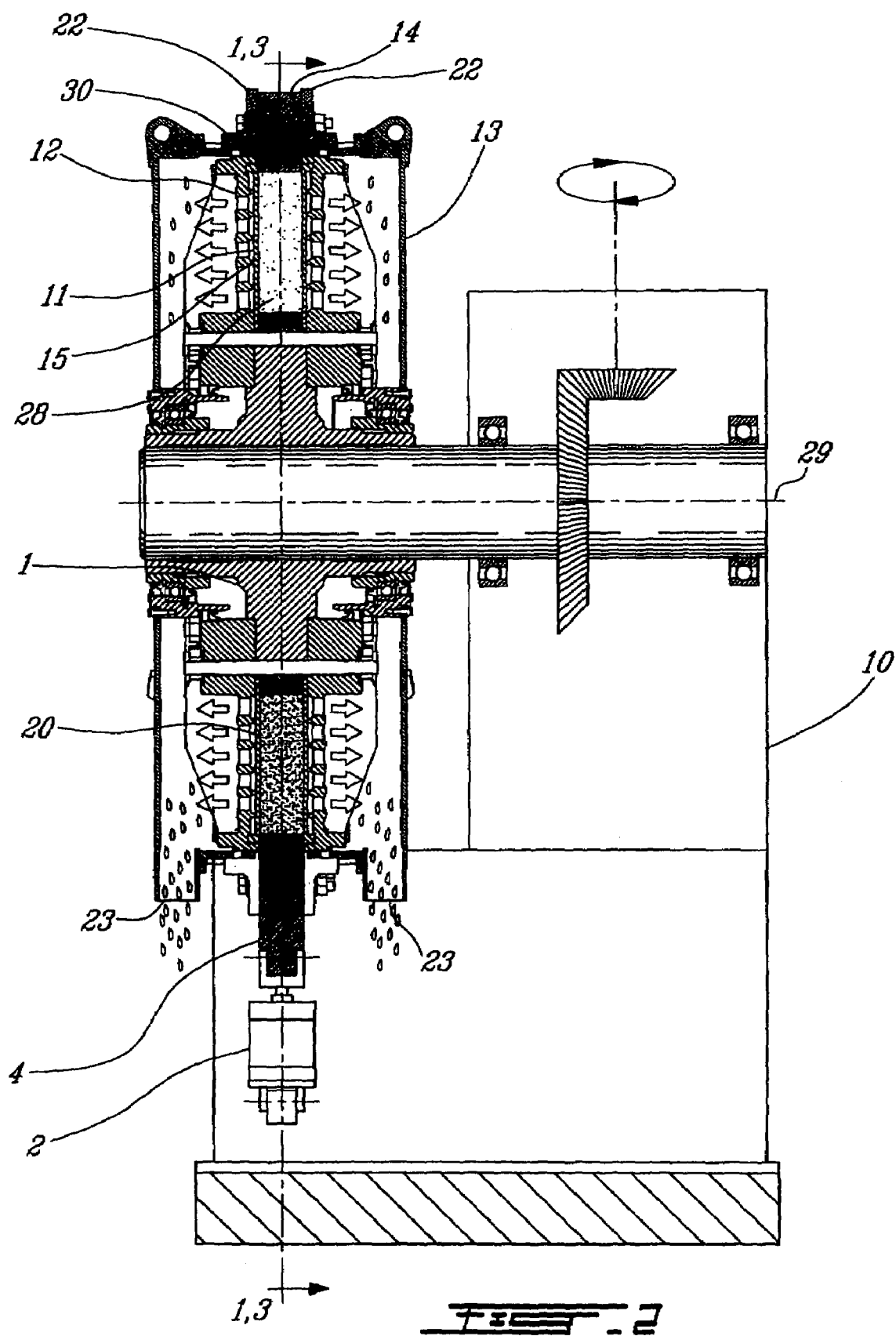
FIG. 2: is a vertical cross-sectional view of the apparatus of FIG. 1 according to the present invention.
Figure 3:
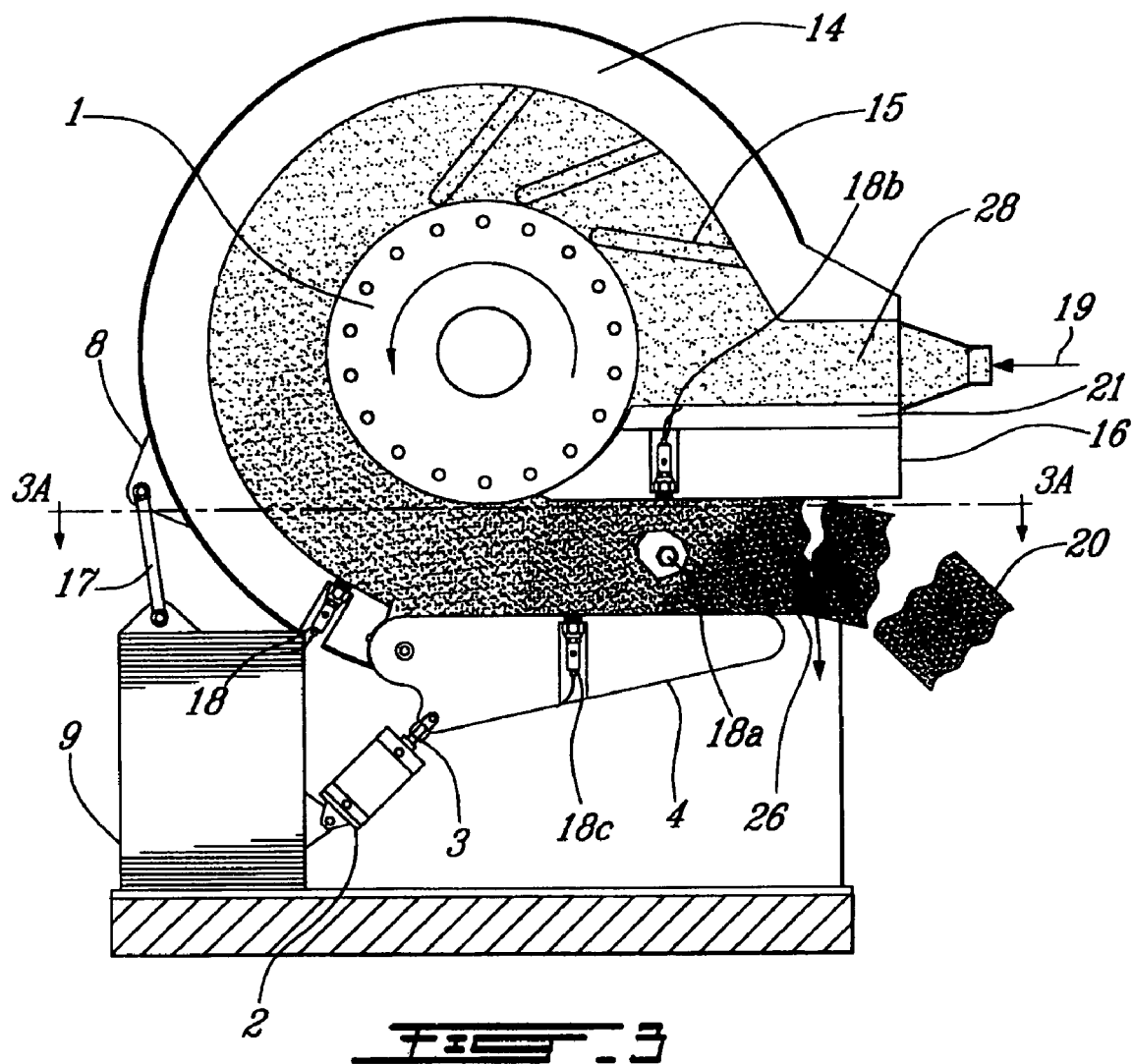
FIG. 3: is a vertical cross-sectional view taken along line 3—3 of FIG. 2 and showing a second exemplary apparatus according to the present invention using a pressure sensor device to control the vertical restrictor.
Figure 3A:
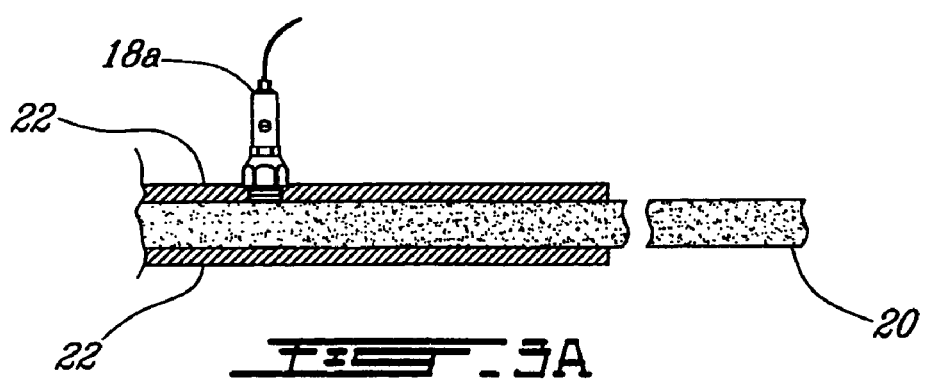
FIG. 3A: is a cross-sectional view taken along line 3A—3A of FIG. 3.
Figure 4:
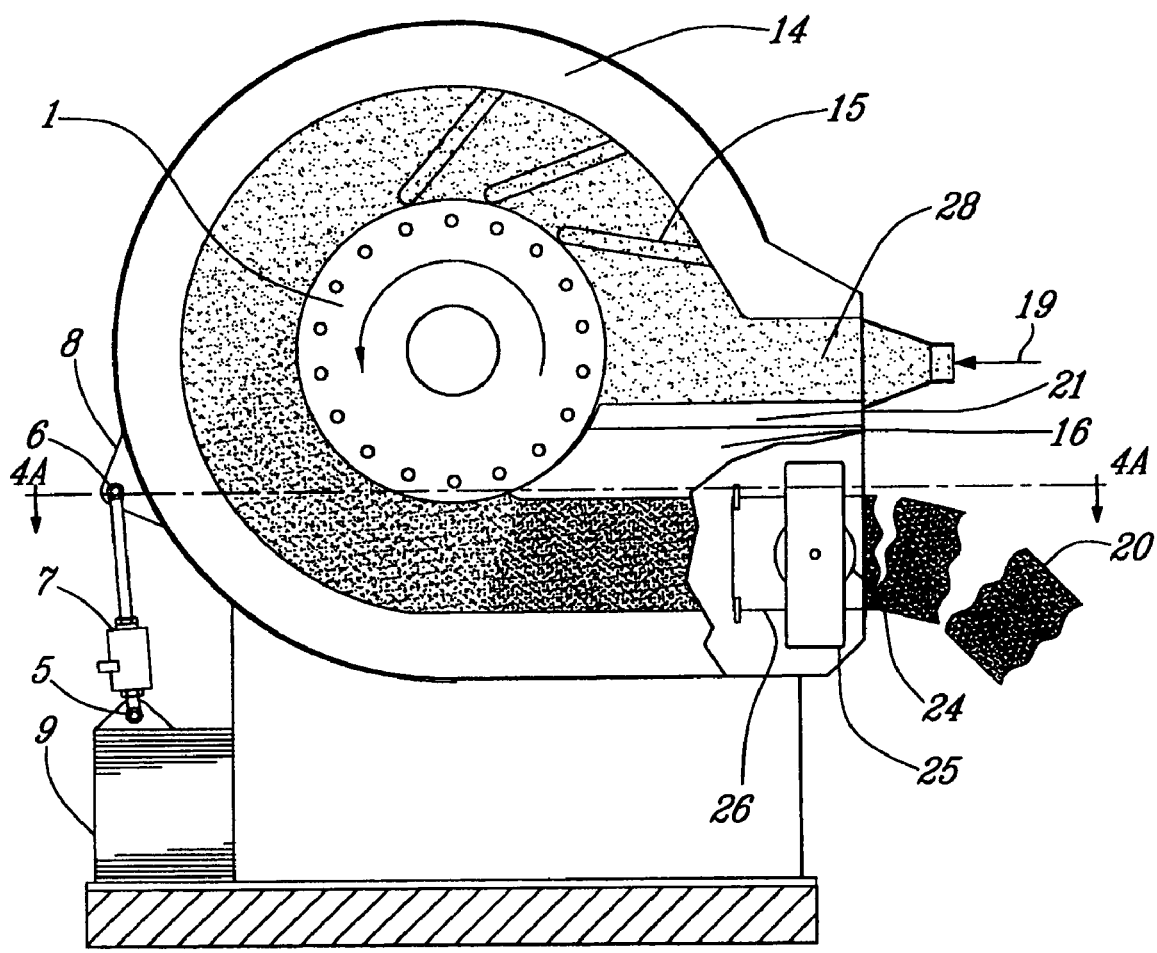
FIG. 4: is a vertical cross-sectional view taken along line 4—4 of FIG. 6 and showing a third exemplary apparatus according to the present invention using a load sensing device to control the lateral restrictor.
Figure 4A:
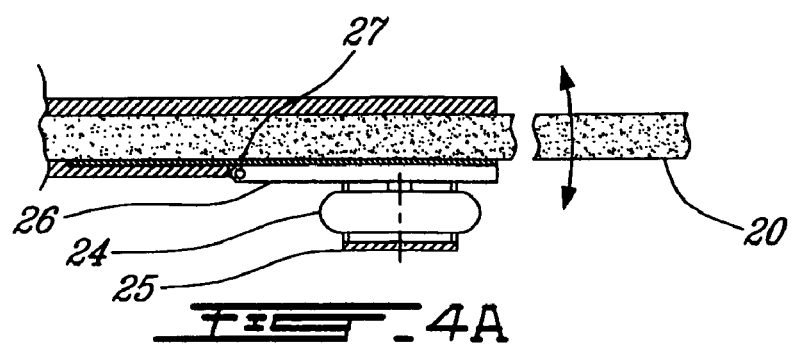
FIG. 4A: is a cross-sectional view taken along line 4A—4A of FIG. 4.
Figure 7:
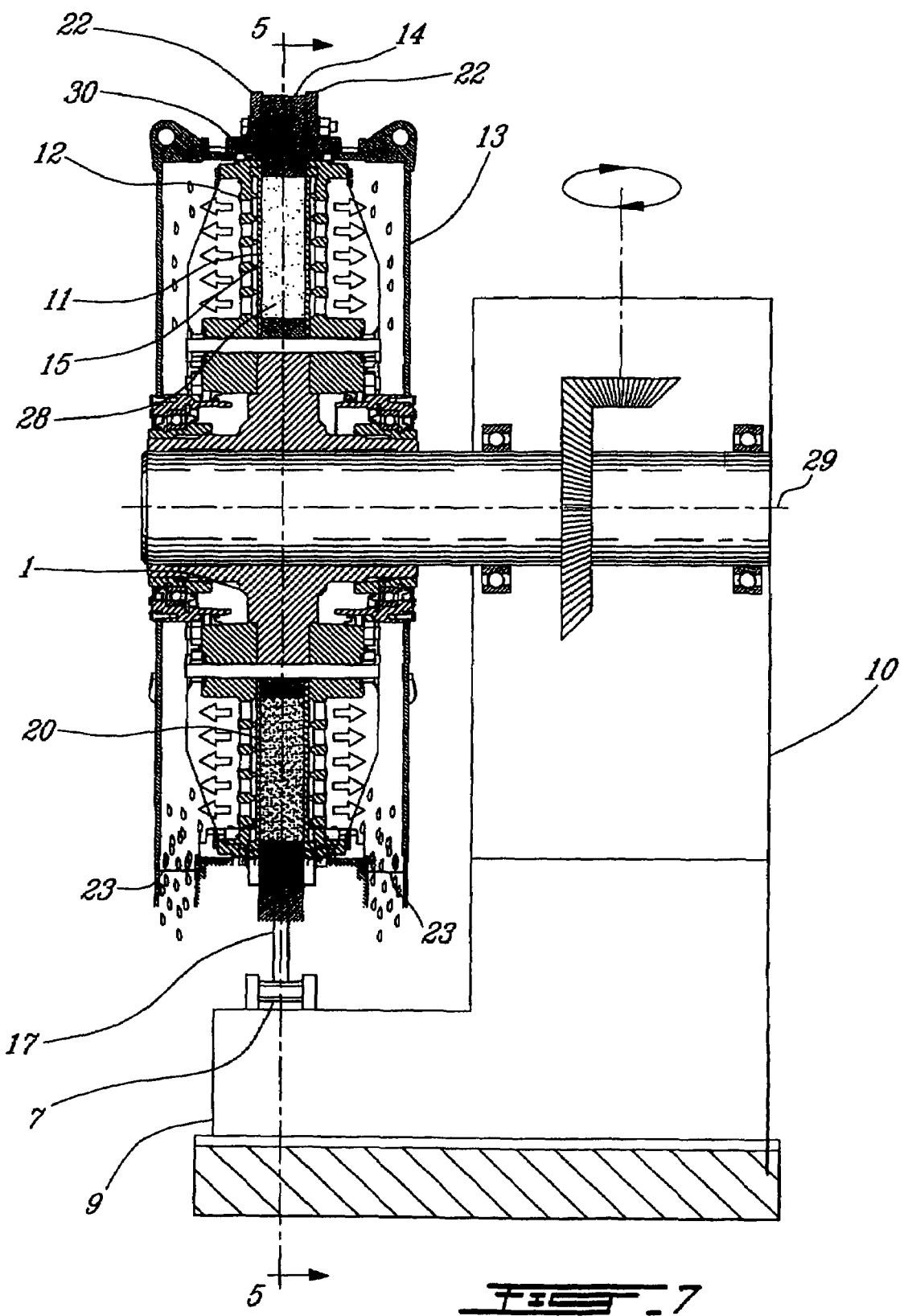
FIG. 7: is a vertical cross-sectional view of the apparatus of FIG. 5 using a pressure sensing device to control a lateral restrictor.

More particularly, in FIGS. 1, 2 and 3:
item 1 is a schematic illustration of the section of the stator (frames, exterior spacers) that is free of linear outlet with a straight rectangular section;
item 2 is the vertical actuator that favours the formation of the cake and the maintenance of the siccity depending upon the force applied;
item 3 represents the devise used for applying pressure on the vertical actuator;
items 18 are schematic representations of sensors used to measure the pressure generated by the friction of the cake in the extraction channel;
item 5 is a schematic representation of the control system used for automatically monitoring the functioning of the vertical restrictor at the outlet of the channel according to instructions pre-determined by the operator of the system and the measures made with the pressure sensor. Then the operator may generate via a convertor that converts the electrical influx in a pneumatic pressure, a thrust on the restrictor; and
the item 6 shows the support of the actuator 7.

The reference numbers used in the Figures have the following meaning:
(1) inner spacer
(2) actuator
(3) female rod clevis
(4) vertical restrictor
(5) lower load cell bracket
(6) upperload cell bracket
(7) load measuring device
(8) anti-rotation device
(9) base
(10) speed reducer
(11) screen
(12) screen support wheel
(13) gland cover
(14) outer spacer
(15) scraper
(16) deflector
(17) link arm
(18) pressure sensor
(18a/18b/18c) alternative positions for pressure sensor
(19) humid mass inlet
(20) cake
(21) washing apparatus
(22) housing
(23) filtrate outlet
(24) actuator
(25) actuator attachment bracket
(26) lateral restrictor
(27) lateral restrictor pivot axle
(28) humid mass
(29) rotation axle
(30) seal Exemplary apparatuses according to the present invention are shown generally by reference in FIGS. 1 to 7.

The present invention relates to an apparatus and method for extracting liquid from humid mass or dewatering channel.

The apparatus comprises a type of press for dewatering suspension with a pressure at the outlet, which will affect the flow of humid mass, production rate and the dryness of cake.

The apparatus and method according to the present invention operate on a similar extraction principle as the system and method described in U.S. Pat. No. 5,344,575 and CAN. Pat. No. CA-A-1,193,903 that are commercialized under the trade mark Rotary Press.

This apparatus, according to the present invention, could be fabricated with one channel, as illustrated on FIGS. 1 to 8 or with many channels present in the same dewatering unit.

DESCRIPTION OF THE PREFERRED EMBODIMENTS

Referring to FIGS. 1 and 2, the apparatus incorporates a pair of rotating screens 11, which form the lateral sides of a rectangular channel. Upper and lower sides of the rectangular channel are formed by an outer spacer 14 and the inner spacer 1. Both screens 11 operate parallel one to the other. Three sides of the channel are rotating together at a low speed around an axle 29. Those three sides are defined by the two screens 11 and the inner spacer 1. The distance between the screens 11 is fixed and determined prior to manufacturing, depending on the type of humid mass to be processed.

Fixed deflector 16 is mounted across the channel and is supported by housing 22 in order to separate the humid mass 28 from the cake 20 going out of the apparatus. Humid mass inlet 19 is provided at the upstream end of the channel.

Fixed non-rotating parts of the apparatus include the housing 22 made of two spaced side members, the outer spacer 14 therebetween, a gland cover 13. Gland cover 13 has three functions: it is used to hold the seal 30, to contain and drain the filtrate through the filtrate outlet 23 and to support the load coming from the housing.

In order to build an inside pressure into the apparatus, a vertical restrictor 4 is mounted at the outlet or downstream end of the channel. The vertical restrictor 4 is activated by an actuator 2 which modulates by compressing or releasing the restrictor 4 in order to control the outgoing cake 20. The actuator 2 is fixed to a static part of the press at one end, and connected to the vertical restrictor 4.

Load reading device 7 inserted between the housing 22 and the base 9 is provided to collect the working load of the apparatus. This working load is used to control one or many of the operating variables of the apparatus, the operating variable being the rotating speed, actuator loading, the restrictor positioning or the humid mass inlet pressure.

A static washing apparatus 21 could be incorporated to the deflector 16 to allow water to clean the screens 11. Also static scrapers 15 could be mounted in contact with the screens 11, inside the channel to clean the screens and to improve production rate.

Under operation, the humid mass 28 is continuously fed at a low pressure into the rectangular channel through the inlet 19. Under the effect of the low inlet pressure, part of the liquid contained in the humid mass flow is drained through the screens 11. The drained liquid is captured in the interior of the gland cover 13. Under the effect of the humid mass volume diminution, due to the liquid drainage and combined with the rotation effect of the screens, the humid mass 28 is then pushed so as to travel ahead into the channel and becomes semi-humid as it goes.

The action of the vertical restrictor 4 together with the friction effect of the semi-humid mass on the screen creates a high pressure build up into the downstream end portion of the channel. This pressure results in extra liquid being drained through the screens 11 prior to the cake being expulsed from the apparatus under a semi-dry condition. Outgoing dryness depends from the humid mass type, dewatering and apparatus adjustment.

Another alternative embodiment of the device for performing the draining of a solid mass of the present invention is illustrated in FIG. 3. In FIG. 3, a pressure sensor 18 is used to collect the inside channel pressure exerted by the semi-dry cake 20. The pressure sensor could be positioned at any location around the channel as shown at 18, 18*a*, 18*b* and 18*c*. Depending on the pressure measured by the sensor 18, the actuator 2 may be operated to move the vertical restrictor 4 and adjust the pressure on the cake 20 at the downstream end of the channel.

In fact, the inside pressure reading is used to control one or many of the operating variables of the apparatus, such as the rotating speed, actuator loading, the restrictor positioning (as mentioned above), or the humid mass inlet pressure.

FIGS. 4, 5, 6 and 7 illustrate further variations of the apparatus of the present invention.

For instance, the restrictor can be mounted laterally at 26 (see FIGS. 4 to 7) on one or two sides of the channel using either a load measuring device 7 (see FIGS. 4 and 6) or a pressure sensor 18 (see FIGS. 5 and 7) as previously described to control the operation variable.

TESTING EXAMPLE 1

A mixed primary and the secondary sludge from a pulp and paper process containing 4% by weight of total solids was used in Testing Example 1. The percentages are calculated according to the following method (Standard Method No. 2540-B of the American Public Health Association):

Total Solids Dried At 103–105° C.

1. General Discussion
    a) Principle: a well-mixed sample is evaporated in a weighed dish and dried to constant weight in an oven at 103 to 105° C. The increase in weight over that of the empty dish represents the total solids. The results may not represent the weight of actual dissolved and suspended solids in wastewater samples (see above).
    b) Interferences: highly mineralized water with a significant concentration of calcium, magnesium, chloride, and/or sulfate may be hygroscopic and require prolonged drying, proper desiccation, and rapid weighing. Exclude large, floating particles or submerged agglomerates of non-homogeneous materials from the sample if it is determined that heir inclusion is not desired in the final result. Disperse visible floating oil and grease with a blender before withdrawing a sample portion for analysis. Because excessive residue in the dish may form a water-trapping crust, limit sample to no more than 200 mg residue.
2. Apparatus
    a) Evaporating dishes: dishes of 100-mL. capacity made of one of the following materials:
        1) Porcelain, 90 mm diam.
        2) Platinum—Generally satisfactory for all purposes
        3) High-silica glass. (Vycor, product of Corning Glass Works, Corning, N.Y., or equivalent).
    b) Muffle furnace for operation at 500±50° C.
    c) Steam bath.
    d) Desiccator, provided with a desiccant containing a color indicator of moisture concentration or an instrumental indicator.
    e) Drying oven, for operation at 103 to 105° C.

f) Analytical balance, capable of weighing to 0.1 mg.

g) Magnetic stirrer with TFE stirring bar.

h) Wide-bore pipets (Kimble Nos. 37005 or 37034B, or equivalent).

3. Procedure a) Preparation of evaporating dish: If volatile solids are to be measured ignite clean evaporating dish at 500±50° C. for 1 h in a muffle furnace. If only total solids are to be measured, heat clean dish to 103 to 105° C. for 1 h. Store and cool dish in desiccator until needed. Weigh immediately before use.

b) Sample analysis: Choose a sample volume that will yield a residue between 10 and 200 mg. When very low total suspended solids are encountered (less than 10 mg/L), less residue may be collected; compensate by using a high-sensitivity balance (0.002 mg). Pipet a measured volume of well-mixed with a magnetic stirrer during transfer. If necessary, add successive sample portions to the same dish after evaporation. When evaporating in a drying oven, lower temperature to approximately 2° C. below boiling to prevent splattering. Dry evaporated sample for at least 1 h in an oven at 103 to 105° C., cool dish in desiccator to balance temperature, and weigh. Repeat cycle of drying, cooling, desiccating, and weighing until a constant weight is obtained, or until weight change is less than 4% of previous weight or 0.5 mg, whichever is less. When weighing dried sample, be alert to change in weight due to air exposure and/or sample degradation. Duplicate determinations should agree within 5% of their average.

4. Calculation $$\text{mg total solids}/L = \frac{(A-B) \times 1000}{\text{sample volume, ML}}$$

where: A=weight of dried residue+dish, mg, and
B=weight of dish, mg.

The sludge was stocked into a four cubic meters tank. A cationic polymer was added in to the sludge inside a flocculation tank to allow a separation between the solids and the liquid phase. This conditioned sludge that is characteristic of de-inking pulp and paper processes was fed into a rotary press channel mounted with a vertical outlet restrictor and load sensing measuring device.

The sludge pressure at the inlet of the flocculator was maintained to a set point value between 20 to 30 kPa (3 to 4 PSI). The rotary press speed (according to FIGS. 1 and 2) was set to 1 RPM and the outlet load force at 4000 lbs (1818 kg). The width between the filtering elements was fixed to 50 millimetres (2 inches). The height of the channel was fixed to 250 millimetres (10 inches).

The control of the vertical restrictor was operated according to the following principle. A load-measuring device read in continue the outlet force generate by the friction inside the channel. When the load was below or higher the set point fixed by the operator, the control loop activate or de-activate the actuator in order to increase or to decrease the pressure on the vertical restrictor.

The filtrate that was generated by the drainage zone in the first part of the rotating screen was very clear. In fact, the capture rate obtained during the entire test was over 97% of total suspended solids.

The friction force generated by the slow moving screens, coupled with the controlled outlet restriction, resulted in a cake of a very dry consistency. The results of the cake dryness varied between 38 to 45% of total solids.

The power usage (kw) for one channel of the rotary press varied between 0.75 to 1.95 (kw). The calculation formula for the power usage is following:

$$\text{Power Usage (kw)} = \frac{S(0.74\,\text{Ft} - 89.67\,P)}{9553}$$

Where: S is the speed of the rotary press (RPM);

FT is outlet force read on the load cell (lbs) or also named load reading device;

P is the pressure on the pneumatic actuator (PSI);

0.74 is a constant depending on the level arm between load reading device and rotative axle;

89.67 is a constant depending on the level arm between the actuator and the rotative axle; and wherein 9553 is a constant depending on the units used for calculation.

During the continuous operation of the dewatering equipments, neither clogging of the screens or a reduction in a degree of the liquid removal was noted.

TESTING EXAMPLE 2

Septage sludge from a municipal wastewater plant containing 1 to 3% by weight of solids was used in Testing Example 2.

A prototype unit was installed built. The sludge was stoked into a four cubic meters tank. A cationic polymer was added into the sludge inside a flocculation tank to allow a separation between the solids and the water. This conditioned sludge was fed into a rotary press channel (according to FIG. 3) mounted with the new vertical outlet restrictor.

The sludge pressure at the inlet of the flocculator was maintained to a set point between 10 to 20 kPa (1 to 3 PSI). The rotary press speed was set at 1.5 to 2.5 RPM and the outlet pressure at 200 kPa (29 PSI). The width between the filtering elements was adjusted to 50 millimetres (2 inches). The height of the channel was fixed to 250 millimetres (10 inches). The way to control the vertical restrictor was different than the Test Example 1.

A pressure sensor located into the vertical restrictor of the channel read in continue the outlet pressure generate by the cake friction. When the outlet pressure was below or higher the set point fixed by the operator, the control loop activate or de-activate the actuator in order to increase or to decrease the pressure on the vertical restrictor.

The filtrate that was generated by the drainage zone in the first part of the rotating screen was also very clear. In fact, the capture rate obtained during the entire test was over 96 to 98% of total suspended solids.

The frictional force of the slow moving screens, coupled with the controlled outlet restriction, resulted in the extrusion of a very dry cake. The results of the cake dryness varied between 36 to 41% of total solids.

During the continuous operation of the dewatering equipments, neither clogging of the screens or a reduction in a degree of the liquid removal was noted.

TESTING EXAMPLE 3

A mixed sludge from a pulp and paper process containing 6% by weight of dry solids was used in Testing Example 3. The sludge was chemically conditioned with a polymer prior to dewatering. The polymer and the sludge were mixed into a flocculator. This conditioned sludge was fed into the dewatering apparatus (according to FIGS. 1 and 2).

The sludge pressure at the inlet of the apparatus was maintained to a set point of 3.5 PSI. The apparatus rotating speed was set to 1 RPM and the load force was adjusted between 2500 to 6000 lbs.

Depending of the load force adjustment, the cake dryness was reached between 42 to 57% of total solids. The production for one channel varied between 1027 to 612 dry lbs/channel/hr.

Graphic 1 shows the effect of the load force on the cake dryness.

Graphic 2 shows the impact of the load force on the production.

TESTING EXAMPLE 4

A sludge from a municipal waste water plant containing 3% by weight of dry solids was used in Testing Example 4.

The sludge was chemically conditioned with a polymer prior to dewatering. The polymer and the sludge were mixed into a flocculator. This conditioned sludge was fed into the dewatering apparatus as per FIG. 5.

The sludge pressure at the inlet of the apparatus was maintained to a set point of 2 PSI. The apparatus rotating speed was set at 2 RPM and the outlet pressure was adjusted from 15 to 90 PSI.

Depending of the outlet pressure adjustment, the cake dryness varied from 36 to 51% of total solids content. The production for one channel varied between 673 to 1124 dry lbs/channel/hr.

Graphic 3 shows the effect of the outlet pressure on the cake dryness.

Graphic 4 shows the impact of the outlet pressure on the production.

TESTING EXAMPLE 5

A primary sludge from a municipal wastewater treatment plant was used in Testing Example 5.

The goal of this test was to confirm the impact of sludge dryness for a channel mounted with an outlet control system versus a channel without control system.

The sludge was chemically conditioned with a polymer prior to dewatering. The polymer and the sludge were mixed into a flocculator. This conditioned sludge was fed into the dewatering apparatus represented on FIG. 5.

The sludge pressure at the inlet of the apparatus was maintained to a set point of 3 PSI. The apparatus rotating speed was set at 1.6 RPM.

The results obtained with the channel mounted with an outlet control system are showed in graphic 5. Depending of the sludge dryness variation, the results of the cake dryness was measured and reached between 33 to 37% of total solids. The production for one channel varied between 275 to 550 dry lbs/channel/hr. The operation of the dewatering apparatus was safe and easy with no operational problem.

Graphic 5 shows the effect of the sludge dryness versus the production and the cake dryness for an outlet control system.

The results obtained with the channel without outlet control system are showed on graphic 6. Depending of the sludge dryness, the results of the cake dryness was measured and reached between 35 to 56% of total solids. The production for one channel varied between 275 to 350 dry lbs/channel/hr. The operation of the dewatering apparatus was more difficult. The cake dryness gradually increases until the channel outlet clog.

Graphic 6 shows the impact of the sludge dryness versus the production and the cake dryness for a channel without control system.

TESTING EXAMPLE 6

Essays of the Vertical Restrictor Using High Friction Coefficient Sludge

Series of essays were carried out in order to evaluate the efficiency of the vertical restrictor on various sludge exhibiting a high friction coefficient. Industrial residues of rubber constitute these sludges. Their friction coefficient is determined in the laboratory. An analysis allows to qualitatively evaluating the friction degree of each sludge.

The results obtained with the vertical restrictor were conclusive. The following table shows the average yield of the dehydration system during essays.

| Average yields - High friction coefficient sludge | | | |
|---|---|---|---|
| Sludge MST (%) | Cake MST (%) | Production by canal (kg sec/h) | Capture Rate (%) |
| 3.21 | 64.53 | 311 | 98.4 |

The dehydration system worked very well during the essays. Although, sludge had a high friction coefficient, the dehydration channel was not clogged at its exhibit. Starting and stopping the apparatus was performed without any problem. The vertical restrictor has demonstrated a high flexibility when operating the dehydration system.

Figure 8:
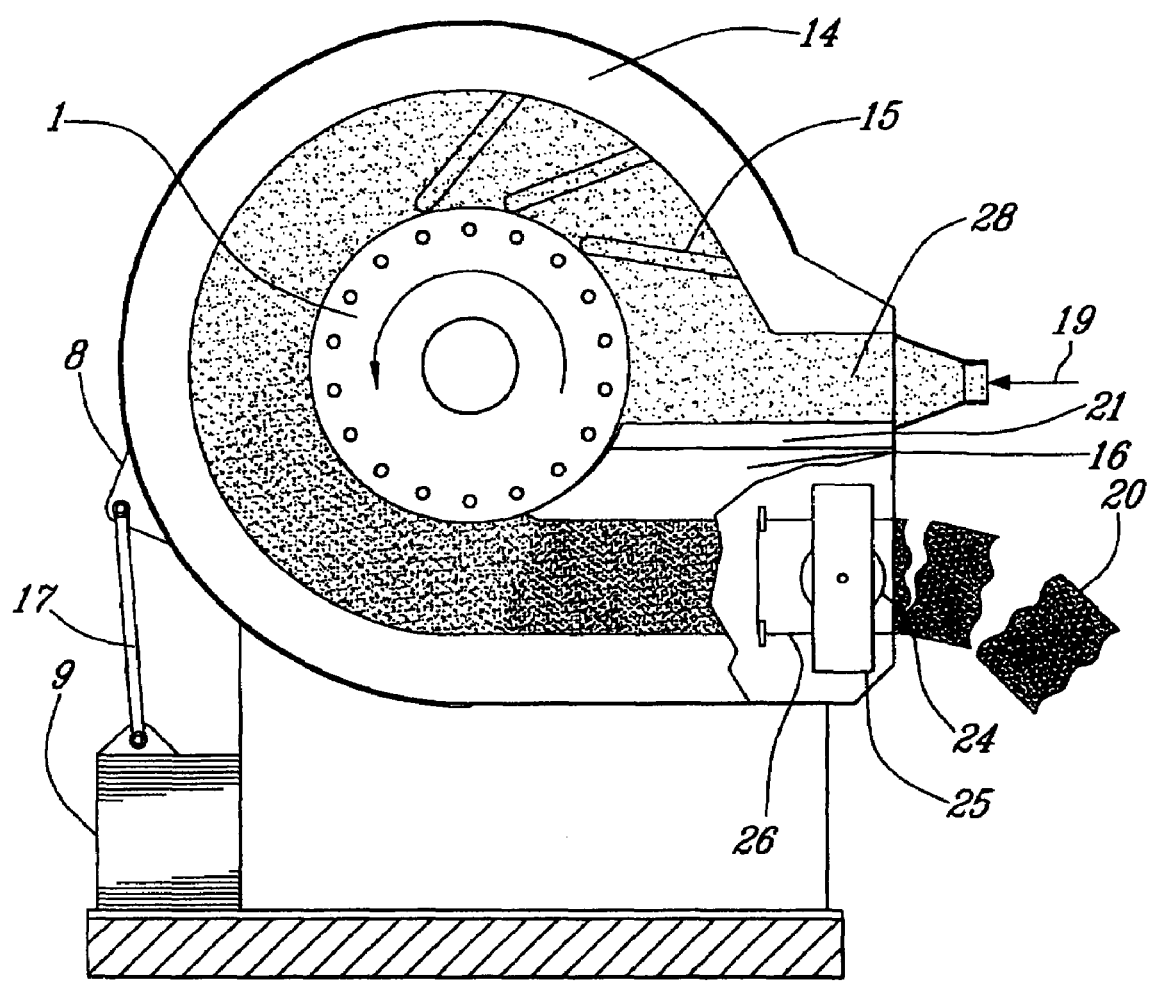
FIG. 8: is a vertical cross-sectional view of a conventional system with valves and walls according to U.S. Pat. No. 5,344,575.
Figure 9:
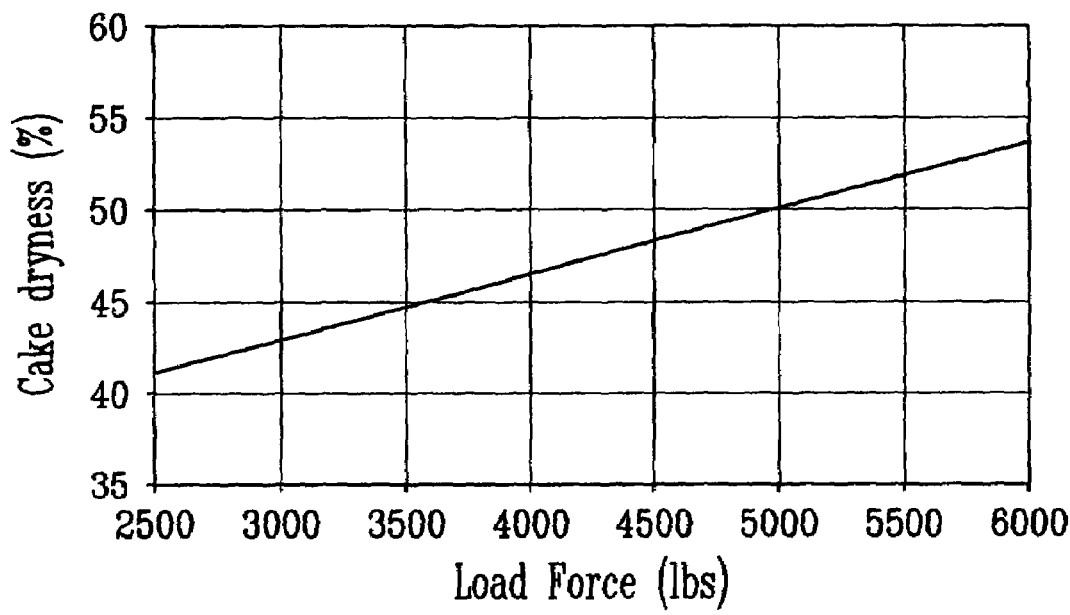
FIG. 9: is a representation of graphic 1.
Figure 10:
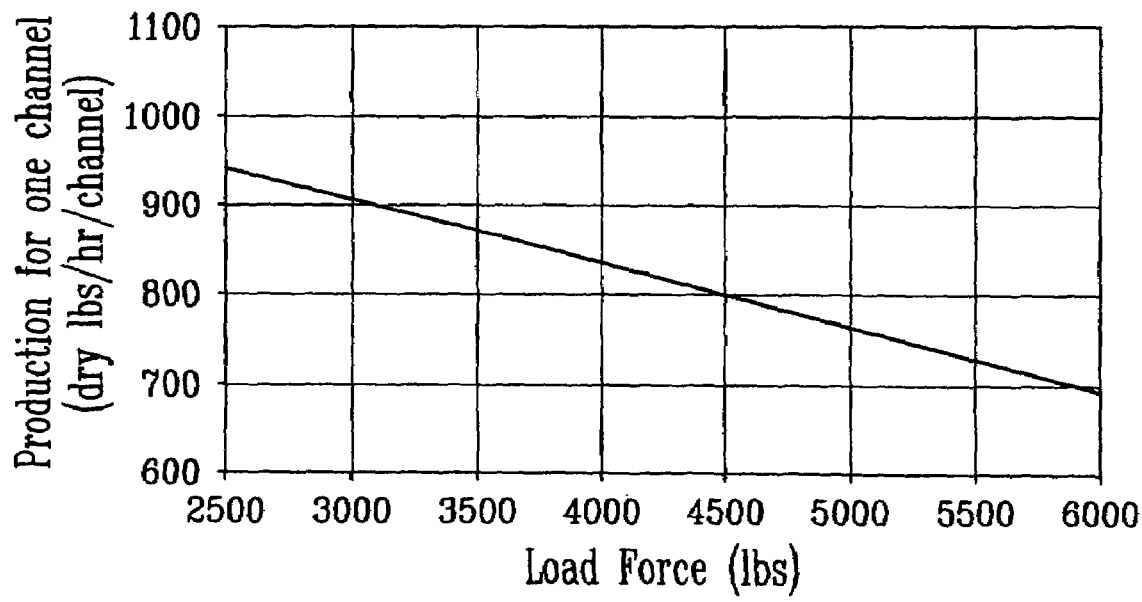
FIG. 10: is a representation of graphic 2.
Figure 11:
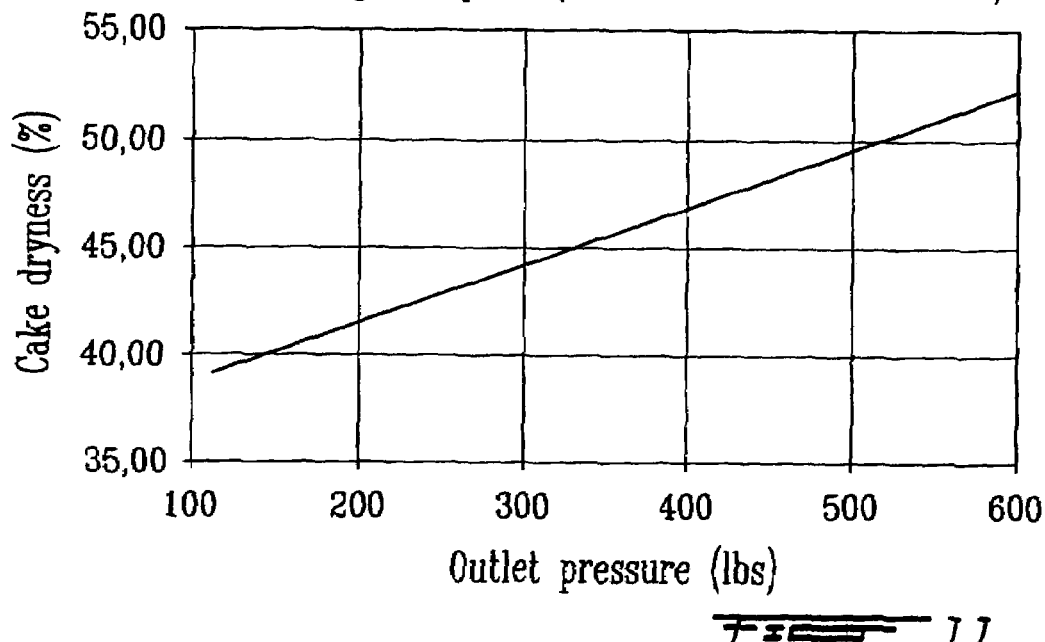
FIG. 11: is a representation of graphic 3.
Figure 12:
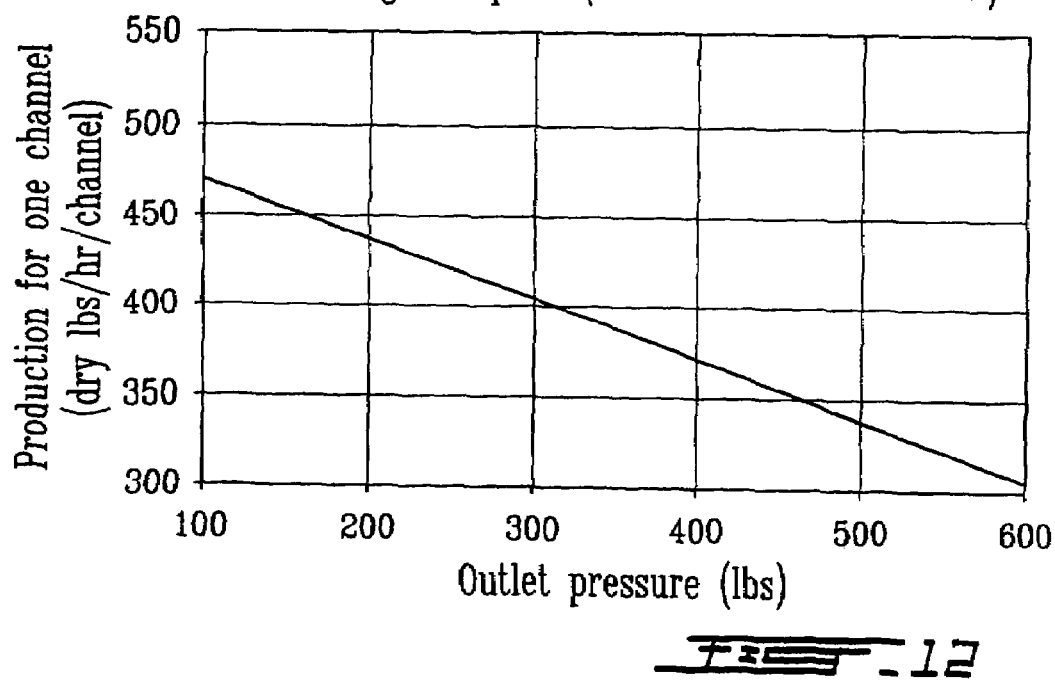
FIG. 12: is a representation of graphic 4.
Figure 13:
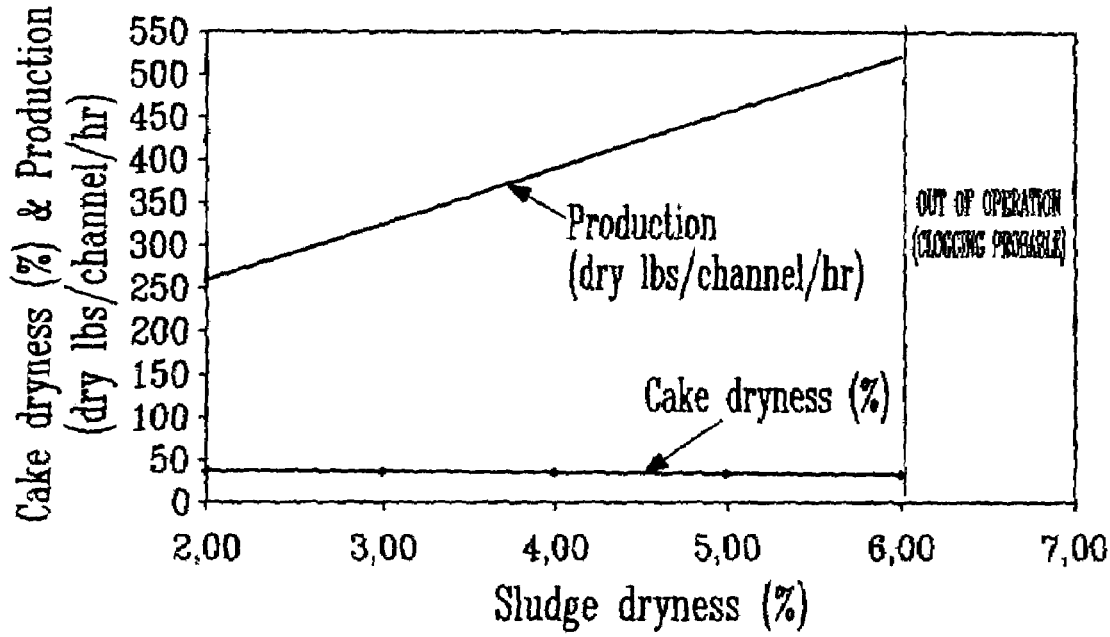
FIG. 13: is a representation of graphic 5.
Figure 14:
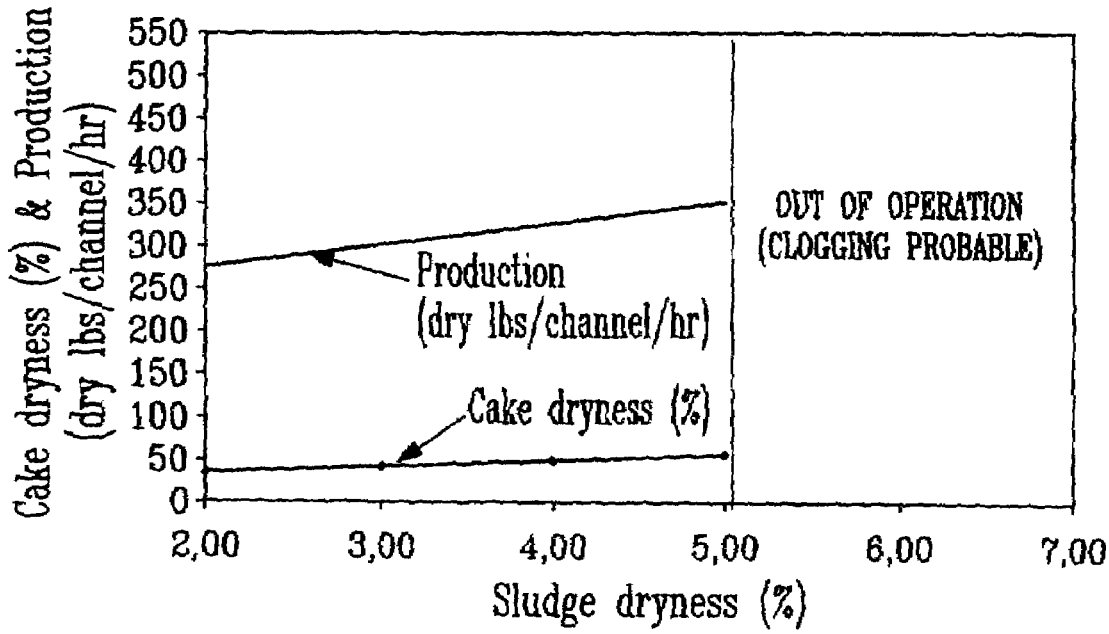
FIG. 14: is a representation of graphic 6.

Essays of the Vertical Restrictor Using Fibered Sludge:

Two series of essays were performed on fibered sludge form paper industries using the vertical restrictor represented on FIG. 8. The amount of fiber in the sludge was determined in laboratory. The analysis allowed to determine the percentage of fibers in said sludge was greater than 100 mesh in a sample of sludge.

Highly conclusive results were obtained using the vertical restrictor with sludge of different composition. The following tables show the average yields reached for the dehydration system series of essays.

| Average yields-Sludge containing 10% of fibers | | | |
|---|---|---|---|
| Sludge MST (%) | Cake MST (%) | Production by canal (kg sec/h) | Capture rate (%) |
| 5.54 | 27.13 | 143 | 95.0 |

Average yields - Sludge containing 25% of fibers

| Sludge MST (%) | Cake MST (%) | Production by canal (kg sec/h) | Capture rate (%) |
|---|---|---|---|
| 6.58 | 49.13 | 469 | 99.0 |

The vertical restrictor allows a simple and efficient operation of the dehydration system without being affected by the amount of fibres present in said sludge. Starting and stopping the apparatus was performed without any problem.

While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent apparatus and methods.

The invention claimed is:

1. An apparatus for extracting a liquid by pressing a humid mass, said apparatus comprising at least one extraction channel for liquid removal, which extraction channel is provided with:
   at least one inlet for feeding the extraction channel with the humid mass to be treated;
   walls provided with holes for allowing liquid contained in the humid mass being pressed to evacuate from said extraction channel, the humid mass gradually becoming a dehydrated mass; and
   at least one outlet for discharging the dehydrated mass, in the form of a cake, obtained by pressing the humid mass in the extraction channel, the cake having a lower liquid content than the humid mass;
wherein the outlet has a downstream end which is further provided with an opened portion in one or more of lateral sides of said downstream end and/or in a bottom of said downstream end, and
wherein said downstream end is further provided in said opened portion with a device applying a level of constraints to the dehydrated mass in the channel to control the holding up the dehydrated humid mass arriving at said outlet, and wherein said device further comprises:
   a first device for measuring the entrainment force exerted by the friction generated, on said extraction channel, by the humid mass being dehydrated, and/or measuring of the pressure within the extraction channel and/or measuring of the pressure on the walls of said extraction channel; and
   a second device to regulate constraints to said dehydrated mass, at the outlet of said extraction channel, as a function of said entrainment force and/or pressure measured with said first system, for controlling the holding up of the dehydrated mass arriving at the outlet of the channel, and for managing the level of constraints generated to said dehydrated mass at the outlet of the extraction channel.

2. A system for extracting a liguid by pressing a humid mass wherein said system comprises a plurality of apparatuses as defined in claim 1.

3. A system for extracting a liguid by pressing a humid mass according to claim 2, wherein said apparatuses are operated by a single motor.

4. A apparatus according to claim 1, wherein said device is one of a gate type and a flap type.

5. A apparatus according to claim 1, wherein said device is adapted to be adjusted vertically.

6. An apparatus according to claim 1, wherein said extraction channel is part of a rotary press.

7. Method for dehydrating a humid mass wherein said humid mass is treated with an apparatus as defined in claim 1.

8. Method according to claim 7, wherein the humid mass to be dehydrated is selected in the group constituted by pulps resulting from paper industries, humid mass resulting from waste water treatment, mineral processing, agriculture and food processing, from fisheries, breweries, wineries, chemical processing, and oil industry.

9. Method according to claim 7, wherein the humid mass to be dehydrated has the ability to develop high friction at the outlet of an extracting and pressing apparatus, and/or for salting out the liquid phase.

10. A process for extracting a liquid from a humid mass, said process comprising the steps of:
   a) feeding with said humid mass an extracting zone, equipped with extracting means and with means for measuring the level of constraints generated in the extracting zone by the humid mass during its treatment;
   b) extracting at least part of the liquid present in the humid mass by pressing said humid mass;
   c) evacuating at least part of the extracted liquid from the extracting zone; and
   d) evacuating the mass with a reduced liquid content obtained in step b) from the extracting zone through an evacuation zone equipped with means for regulating the level of constraints generated by said mass with a reduced liquid content, when going through the evacuation zone; wherein the level of constraints in the evacuation zone is regulated with an apparatus as defined in claim 1.

11. A process for extracting a liquid from a humid mass according to claim 10, wherein the liquid represents from 0.1 to 22.0 weight percent of total weight of said humid mass.

12. A process for extracting a liquid from a humid mass according to claim 10, wherein the humid mass is selected in the group constituted by pulps resulting from paper industries, humid mass resulting from waste water treatment, mineral processing, agriculture and food processing, from fisheries, breweries, wineries, chemical processing, and oil industry.

13. A process for extracting a liquid from a humid mass according to claim 10, wherein the gain in dryness is of at least 5% as measured by the method AFNOR T97-001.

14. A process for extracting a liquid from a humid mass according to claim 13, wherein the gain in dryness is of at least 25%.

15. A process for extracting a liquid from a humid mass according to claim 10, wherein the extracting zone comprises means capable of generating a pressure on the humid mass and walls provided with holes for evacuating at least part the liquid contained in the humid mass being pressed against by the effect of the pressure.

16. A process for extracting a liquid from a humid mass according to claim 10, wherein the walls are equipped with means capable of measuring the pressure exerted on said wall by the humid mass during its treatment.

17. A process for extracting a liquid from a humid mass according to claim 10, wherein the extracting zone is equipped with means capable of measuring the pressure inside the humid mass during the dehydrating process.

18. A process for extracting a liquid from a humid mass according to claim 10, wherein the level of constraints in the outlet zone is controlled as a function of the physical parameter related to the pressure of the humid mass on the wall of the extracting zone.

19. A process for extracting a liquid from a humid mass according to claim 10, wherein the levels of constraints in the outlet zone is controlled by optimization of the various parameters measured in the extracting zone.

20. A process for extracting a liquid from a humid mass according to claim 10, wherein the gain in dryness is of at least 10%, as measured by the method AFNOR T97-001.

* * * * *